(12) United States Patent
Hayashi

(10) Patent No.: US 8,967,200 B2
(45) Date of Patent: Mar. 3, 2015

(54) FLUID CONTROL VALVE

(75) Inventor: Shigeyuki Hayashi, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 403 days.

(21) Appl. No.: 13/441,628

(22) Filed: Apr. 6, 2012

(65) Prior Publication Data
US 2012/0255630 A1 Oct. 11, 2012

(30) Foreign Application Priority Data

Apr. 8, 2011 (JP) ................................ 2011-086700

(51) Int. Cl.
*F16K 47/08* (2006.01)
*F16K 1/34* (2006.01)
*F16K 47/10* (2006.01)
*F16K 31/00* (2006.01)

(52) U.S. Cl.
CPC . *F16K 1/34* (2013.01); *F16K 47/10* (2013.01); *F16K 31/007* (2013.01)
USPC .................................. 137/625.3; 137/625.33

(58) Field of Classification Search
USPC .............................. 137/625.3, 625.33, 625.28
See application file for complete search history.

(56) References Cited

U.S. PATENT DOCUMENTS

| | | | |
|---|---|---|---|
| 5,251,871 A * | 10/1993 | Suzuki | 251/127 |
| 5,927,331 A * | 7/1999 | Suzuki | 137/625.33 |
| 6,782,920 B2 * | 8/2004 | Steinke | 137/625.3 |
| 2010/0243076 A1 * | 9/2010 | Hayashi | 137/455 |
| 2013/0048898 A1 * | 2/2013 | Hayashi | 251/337 |

FOREIGN PATENT DOCUMENTS

| | | |
|---|---|---|
| JP | S6116460 U | 1/1986 |
| JP | H02116071 U | 9/1990 |
| JP | 2010-230159 A | 10/2010 |

OTHER PUBLICATIONS

Japanese Patent Office, Office Action Issued in Japanese Application No. 2011-086700, Dec. 2, 2014, 6 pages. (Translation of Summary Provided).

* cited by examiner

*Primary Examiner* — John Rivell
*Assistant Examiner* — Michael R Reid
(74) *Attorney, Agent, or Firm* — Alleman Hall McCoy Russell & Tuttle LLP

(57) ABSTRACT

In order to provide a fluid control valve that can flow a large amount of fluid with a compact arrangement, ring-shaped bottom formed grooves that are in communication with an upstream side flow channel through a valve inner flow channel and ring-shaped bottom formed grooves that are in communication with a downstream side flow channel through a valve inner flow channel are arranged alternatively and plurally between a seating surface and a valve seat surface, and a communication bore, which is an opening in communication with the bottom formed groove of the valve inner flow channel, is formed at least on the side surface of the bottom formed groove.

10 Claims, 11 Drawing Sheets

FLUID CONTROL VALVE

FIELD OF THE ART

This invention relates to a fluid control valve used for a mass flow controller that controls a flow rate of, for example, a gas.

BACKGROUND ART

The fluid control valve is arranged between an upstream side flow channel and a downstream side flow channel and controls or opens or closes a flow rate of a fluid flowing in the flow channel. For example, an arrangement shown in Patent Document 1 is known as a fluid control valve that controls a flow rate of a gas used for, for example, a semiconductor process.

The fluid control valve shown in Patent Document 1 has an arrangement that toric bottom formed grooves (hereinafter also called first bottom formed grooves) that are in communication with the upstream side flow channel and toric bottom formed grooves (hereinafter also called second bottom formed grooves) that are in communication with the downstream side flow channel are arranged alternatively in multiple layers on a valve seat surface (or a seating surface).

A valve inner flow channel that is arranged on the valve body member or the valve seat member and that is in communication with the upstream side flow channel and the downstream side flow channel is arranged on the bottom formed groove, and the valve inner flow channel is connected to a bottom surface of the bottom formed groove so that a communication bore is formed.

Then, in a state that the seating surface and the valve seat surface are attached, communication between the opening of the first bottom formed groove and the opening of the second bottom formed groove is blocked so as to be in a closed state wherein the upstream side flow channel and the downstream side flow channel are not connected. In a state that the seating surface is separated from the valve seat surface, the opening of the first bottom formed groove is in communication with the second bottom formed groove through a gap between the seating surface and the valve seat surface so as to be in an open state wherein the upstream side flow channel is connected to the downstream side flow channel.

The flow rate flowing in the fluid control valve depends on a separated distance between the seating surface and the valve seat surface assuming that there is no other bottleneck in the flow channel. More strictly speaking, a value achieved by multiplying a total length of a projection formed between the first bottom formed groove and the second bottom formed groove by the above-mentioned separated distance equals a cross-sectional area of the flow channel to be controlled, which represents a valve open degree, and therefore the flow rate flowing in the fluid control valve depends on the valve open degree.

Then, if the bottom formed grooves are formed in multiple layers, since the total length of the projection can be made longer compared with a case that the bottom formed groove is singular, it is possible to shorten the separated distance between the seating surface and the valve seat surface in order to secure the same cross-sectional area of the flow channel, thereby to promote downsizing of the actuator that drives the valve body member. Conversely if the separated distance between the seating surface and the valve seat surface is the same as that of a conventional arrangement, the cross-sectional area of the flow channel increases, thereby to enable increase of the flow rate or reduction of the pressure loss.

According to the above-mentioned principle, it will do well to arrange as many of the bottom formed grooves as possible.

PRIOR ART DOCUMENT

Patent Document

Patent document 1: Japanese Unexamined Patent Application Publication No. 2010-230159

DISCLOSURE OF THE INVENTION

Problems to be Solved by the Invention

However, conventionally, since the communication bore in communication with the bottom formed groove of the valve inner flow channel is formed on the bottom surface of the bottom formed groove, it is not possible to make the width of the bottom formed groove smaller than the inner diameter of the valve inner flow channel so that there is a limitation in arranging the bottom formed groove in multiple layers.

If it is tried to decrease the width of the bottom formed groove by reducing the diameter of the valve inner flow channel and the communication bore, the diameter of the valve inner flow channel or the cross-sectional area of the communication bore becomes the bottleneck so that the wide range of the flow control, namely the maximum possible control flow rate, is in danger of being diminished. In addition, it is problematic that the smaller the diameter of the valve inner flow channel becomes, the more the level of difficulty in manufacturing the valve inner flow channel dramatically increases, and further that the flow channel easily clogs.

Thus, the present claimed invention intends to solve all of these problems, and a main object of this invention is to provide a fluid control valve that can flow a large amount of fluid with a compact arrangement.

Means to Solve the Problems

More specifically, the fluid control valve in accordance with the present claimed invention comprises a pair of valve members on one of which is formed a seating surface and on the other of which is formed a valve seat surface, and generally ring-shaped first bottom formed grooves that are in communication with an outside upstream side flow channel through a first valve inner flow channel arranged inside of the valve member and generally ring-shaped second bottom formed grooves that are in communication with an outside downstream side flow channel through a second valve inner flow channel arranged inside of the valve member are alternately arranged on either one of the seating surface and the valve seat surface, in a state that the seating surface and the valve seat surface are attached, communication between an opening of the first bottom formed groove and an opening of the second bottom formed groove is blocked so as to be in a closed state wherein the upstream side flow channel is not connected to the downstream side flow channel, and in a state that the seating surface is separated from the valve seat surface, the opening of the first bottom formed groove is in communication with the opening of the second bottom formed groove through a gap between the seating surface and the valve seat surface so as to be in an open state wherein the upstream side flow channel is connected to the downstream side flow channel.

In addition, the fluid control valve is characterized by a communication bore that is in communication with the first or second bottom formed groove of the first or second valve inner flow channel that is formed at least on a side surface of the first or second bottom formed groove.

In accordance with this arrangement, since the width of the bottom formed groove is not limited by the diameter of the communication bore, it becomes possible to decrease the width of the bottom formed groove, thereby enabling an arrangement in which more of the bottom formed grooves are provided.

In addition, since the communication bore opens on the side surface of the bottom formed groove, it becomes possible to increase the area of the communication bore as long as the depth of the bottom formed groove is set to be sufficient. This makes it possible to facilitate manufacturing the fluid control valve having a sufficiently big diameter of the valve inner flow channel and to prevent clogging.

A fluid control valve having the following arrangement may be conceived as an embodiment to produce the same operation and effect as those of the above-mentioned arrangement. More specifically, the fluid control valve comprises a pair of valve members on one of which is formed a seating surface and on the other of which is formed a valve seat surface, and generally ring-shaped first bottom formed grooves that are in communication with an outside upstream side flow channel through a first valve inner flow channel arranged inside of one of the valve members are arranged in multiple layers on either one of the seating surface and the valve seat surface and generally ring-shaped second bottom formed grooves that are in communication with an outside downstream side flow channel through a second valve inner flow channel arranged inside of the other valve member are arranged at each position between the adjacent first bottom formed grooves in multiple layers on the other of the seating surface and the valve seat surface, in a state that the seating surface and the valve seat surface are attached, communication between an opening of the first bottom formed groove and an opening of the second bottom formed groove is blocked so as to be in a closed state wherein the upstream side flow channel is not connected to the downstream side flow channel, and in a state that the seating surface is separated from the valve seat surface, the opening of the first bottom formed groove is in communication with the opening of the second bottom formed groove through a gap between the seating surface and the valve seat surface so as to be in an open state wherein the upstream side flow channel is connected to the downstream side flow channel, and the fluid control valve is characterized in that either one of a communication bore that is in communication with the first bottom formed groove of the first valve inner flow channel and a communication bore that is in communication with the second bottom formed groove of the second valve inner flow channel or both of them are formed across a bottom surface and a side surface of the bottom formed groove.

In order to make it possible to expand the size of the communication bore without difficulty, it is preferable that the communication bore is formed across the bottom surface and the side surface of the bottom formed groove.

In order not to reduce the maximum possible flow rate flowing in the fluid control valve due to the communication bore, it is preferable that an area of the communication bore is set to be more than or equal to a cross-sectional area of the valve inner flow channel at a position immediately anterior to the communication bore.

As a concrete arrangement, one representative example of the valve inner flow channel is a valve inner flow channel that extends from a direction of the bottom of the bottom formed groove and a distal end part of which opens on the bottom surface and the side surface of the bottom formed groove to function as the communication bore.

In addition, it may be arranged so that the valve inner flow channel extends from a direction generally orthogonal to the extending direction of the bottom formed groove and its side peripheral surface opens on the bottom surface and the side surface of the bottom formed groove to function as the communication bore.

Effect of the Invention

In accordance with the present claimed invention having the above-mentioned arrangement, since the width of the bottom formed groove is not limited by the diameter of the communication bore, it is possible to reduce the width of the bottom formed groove, thereby enabling to arrange a higher number of bottom formed grooves. As a result of this, since the total extending distance of the projection can be made longer compared with a single bottom formed groove, the separated distance between the seating surface and the valve seat surface can be reduced by just that amount in order to secure the cross-sectional area of the flow channel as that of the single bottom formed groove, resulting in promotion of downsizing the actuator that drives the valve body member. In addition, conversely, if the separated distance between the seating surface and the valve seat surface is the same as that of a conventional arrangement, the cross-sectional area of the flow channel increases, thereby enabling an increase in the flow rate or reduction of the pressure loss.

In addition, since the communication bore opens on the side surface of the bottom formed groove, it becomes possible to increase the area of the communication bore as long as the depth of the bottom formed groove is set to be sufficient. This makes it possible to facilitate manufacturing the fluid control valve having the sufficiently big diameter of the valve inner flow channel and to prevent clogging.

BEST MODES OF EMBODYING THE INVENTION

Figure 1:
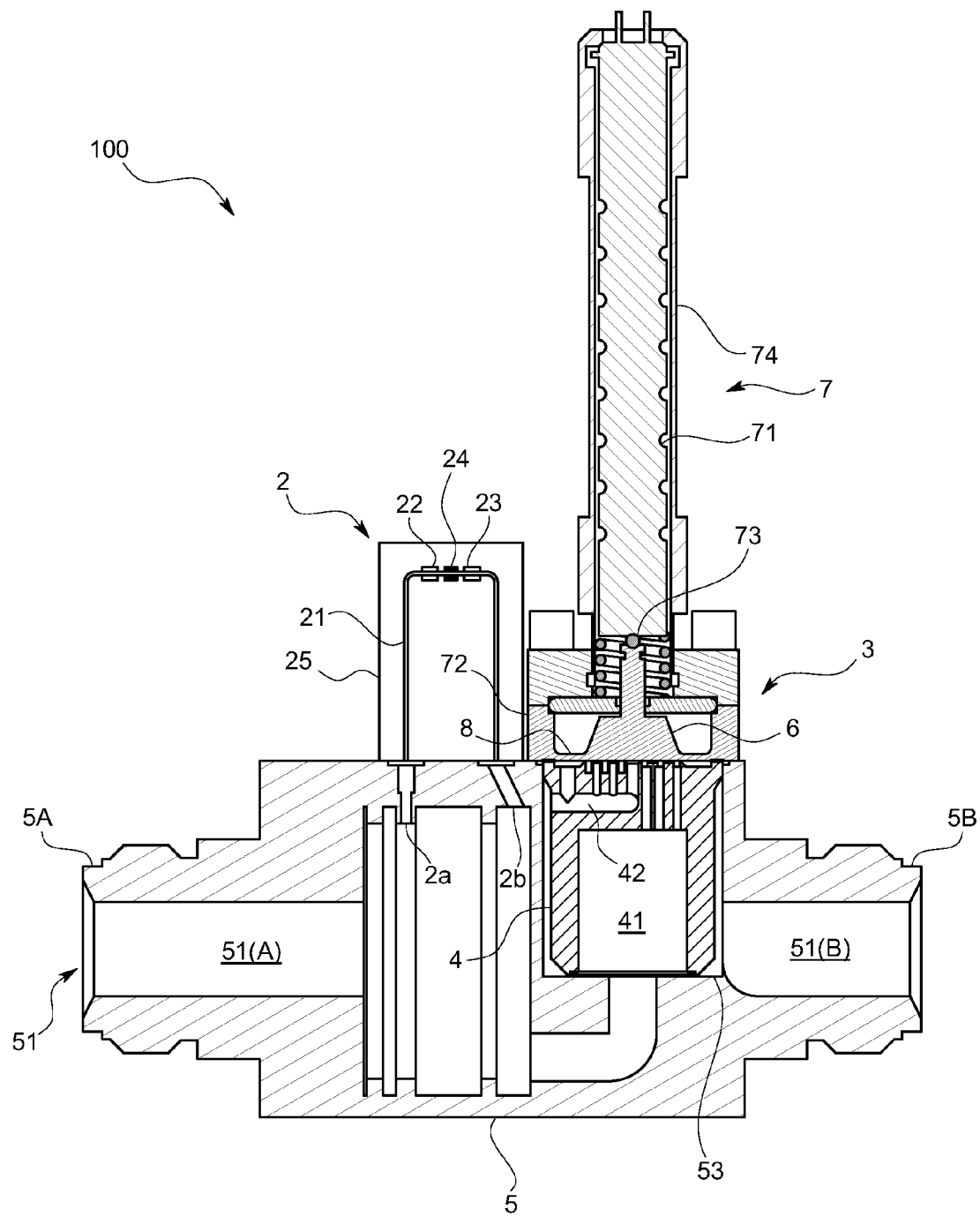
FIG. 1 is an overall cross-sectional view of a mass flow controller in accordance with a first embodiment of this invention.

One embodiment of a mass flow controller 100 into which a fluid control valve in accordance with this invention is incorporated will be explained with reference to the drawings.

First Embodiment

The mass flow controller 100 of this embodiment is used for a semiconductor manufacturing device, and comprises a body 5 that forms a flow channel 51 where a fluid to be measured flows, a flow rate detection mechanism 2 that detects the flow rate of the fluid flowing in the flow channel 51 of the body 5, a fluid control valve 3 that controls the flow rate of the fluid flowing in the flow channel 51 and a control part (not shown in drawings) that controls a valve open degree of the fluid control valve 3 in order to make a measured flow rate output by the flow rate detection mechanism 2 close to a predetermined set flow rate.

Each part will now be explained.

The body 5 is in a shape of a block where the flow channel 51 penetrates, and an upstream end of the flow channel 51 is connected to an outside flow inlet pipe (not shown in drawings) as an inlet port 5A and a downstream end of the flow channel 51 is connected to an outside flow out pipe (not shown in drawings) as an outlet port 5B.

For the flow rate detection mechanism 2, various mechanisms may be conceived, however, a so called thermal flow rate detection mechanism 2 is adopted in this embodiment. The thermal flow rate detection mechanism 2 comprises a narrow pipe 21 connected to the flow channel 51 in parallel so as to introduce a fluid of a predetermined ratio among the fluid flowing in the flow channel 51, a heater 24 arranged on the narrow pipe 21 and a pair of temperature sensors 22, 23 arranged in the upstream side and the downstream side of the heater 24. When the fluid flows in the narrow pipe 21, a difference in temperature corresponding to the mass flow rate is generated between the temperature sensor 22 and the temperature sensor 23, then it is so arranged that the flow rate detection mechanism 2 measures the flow rate based on the temperature difference.

In this embodiment, a elongate case 25 that accommodates the narrow pipe 21, the heater 24, the temperature sensors 22, 23, and its peripheral electric circuit is arranged, a pair of bifurcated flow channels 2a, 2b are arranged to be bifurcated from the flow channel 51 of the body 5, and an introducing port of the narrow pipe 21 is connected to the bifurcated flow channel 2a located in the upstream side and a lead-out port of the narrow pipe 21 is connected to the bifurcated flow channel 2b located in the downstream side by mounting the case 25 on the body 5.

The flow rate sensor is not limited to a thermal flow rate sensor.

The fluid control valve 3 is arranged on the flow channel 51, and comprises a pair of valve members including a valve seat member 4 and a valve body member 6, and an actuator 7 that sets a valve open degree, namely a separated distance between the valve seat member 4 and the valve body member 6 by driving the valve body member 6.

Figure 2:
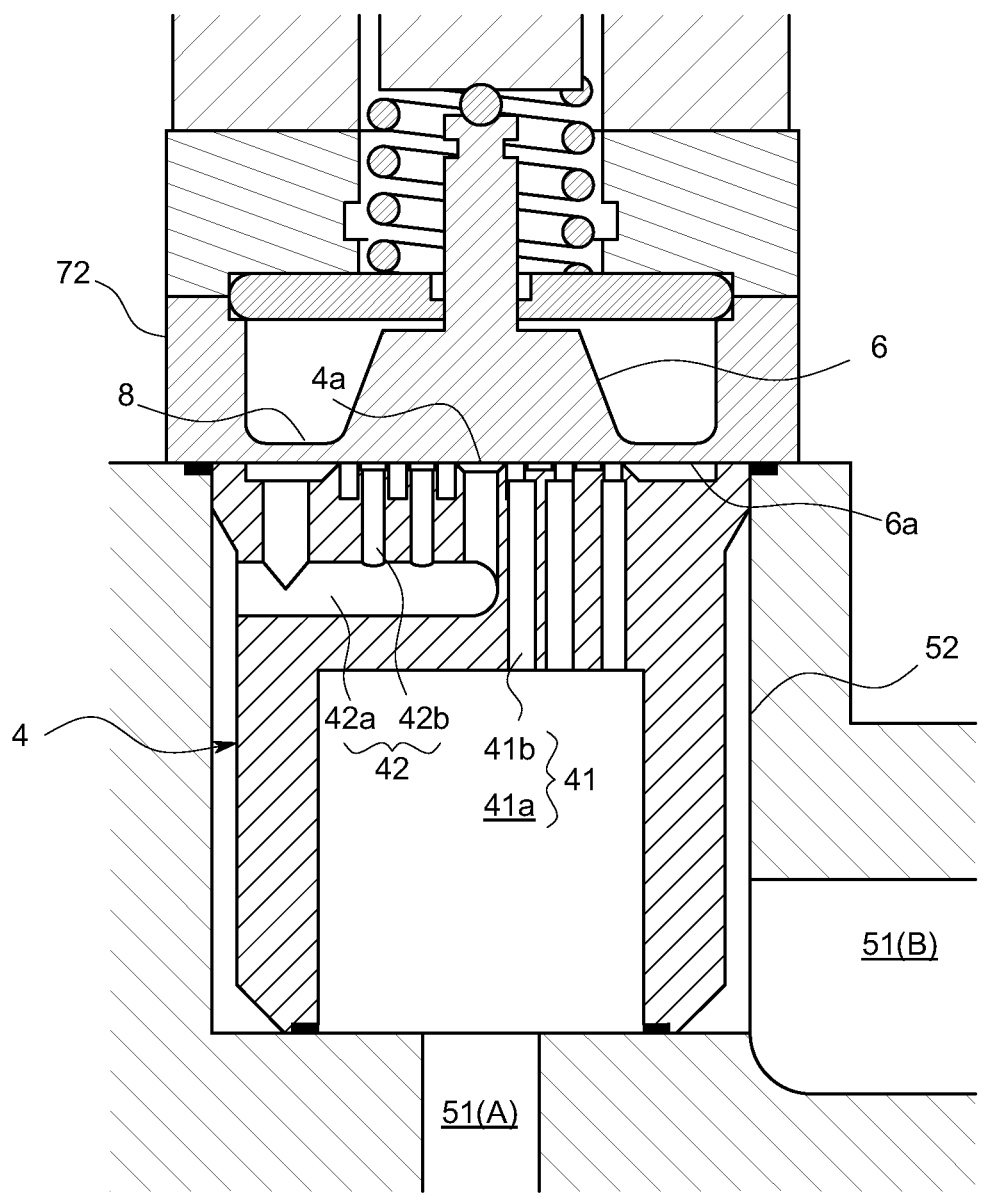
FIG. 2 is a cross-sectional view of a fluid control valve in accordance with this embodiment.
Figure 3:
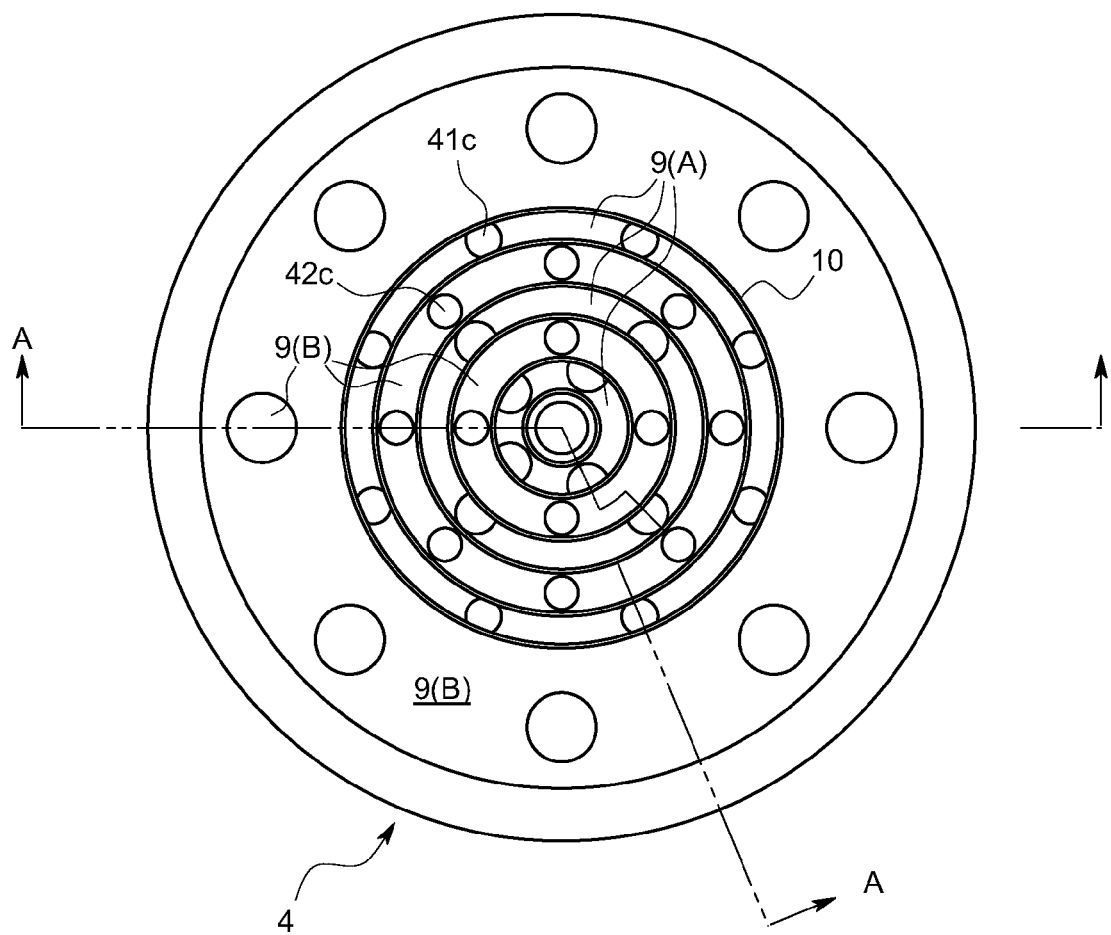
FIG. 3 is a plane view of a valve seat member in accordance with this embodiment.
Figure 4:
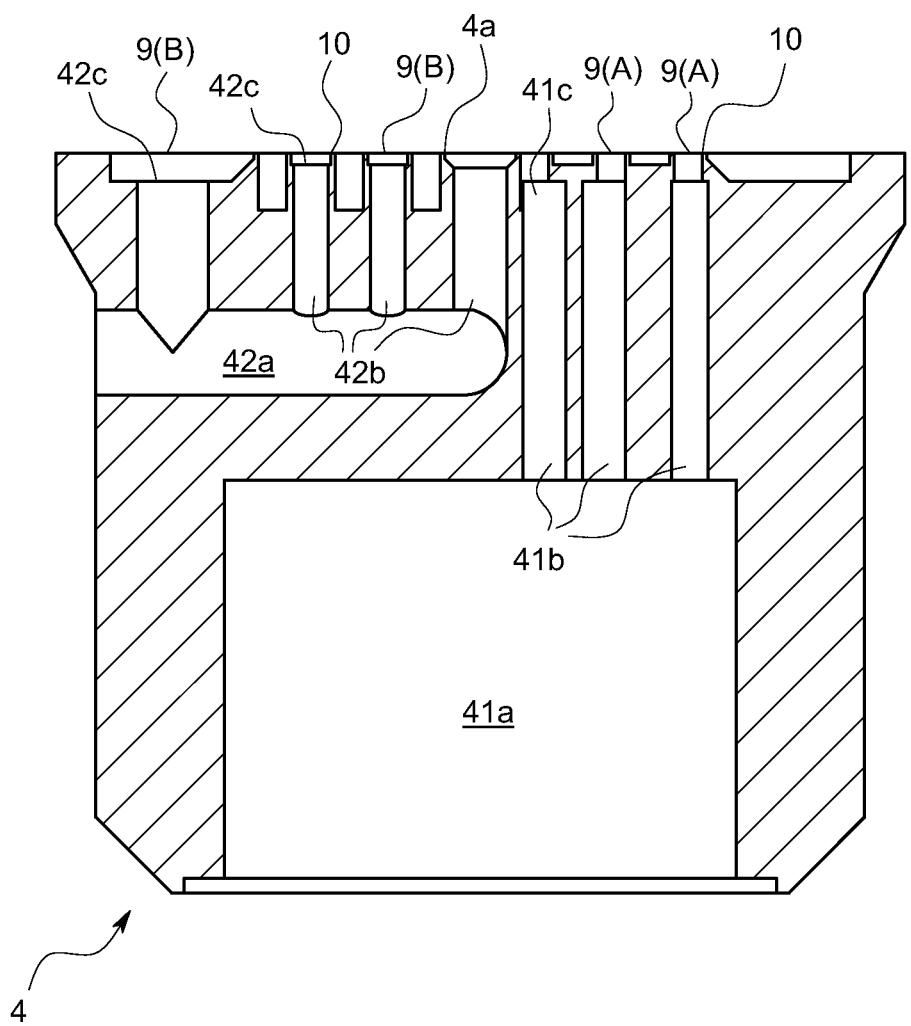
FIG. 4 is a cross-sectional view taken A-A line in FIG. 3.
Figure 5:
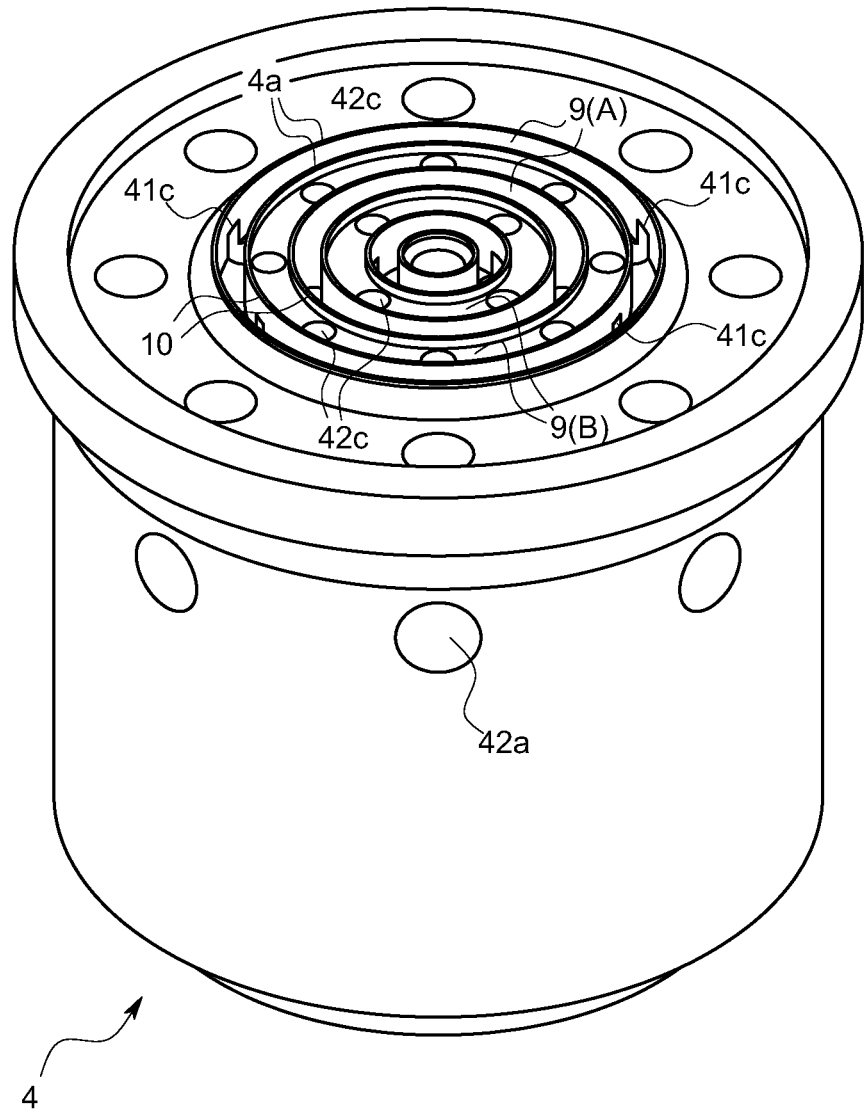
FIG. 5 is a perspective view of the valve seat member in accordance with this embodiment.

The valve seat member 4 is, as shown in FIG. 2 or the like, so arranged that an end surface opposite to a bottom surface serves as a valve seat surface 4a and in a shape of a cylinder with two steps wherein a bottom surface side has a smaller diameter and a valve seat surface side has a bigger diameter than that of the bottom surface side, and inside of the valve seat member 4 arranged are a first valve inner flow channel 41 and a second valve inner flow channel 42.

The first valve inner flow channel 41 comprises a first big diameter channel 41a whose one end opens on the bottom surface of the valve seat member 4, and a plurality of first small diameter channels 41b that diverge from other end part of the first big diameter channel 41a and that extend in an axial direction of the valve seat member 4 so as to be in communication with the valve seat surface 4a.

The second valve inner flow channel 42 comprises a second big diameter channel 42a that extends in a radial direction and one end of which opens on a side surface of the small diameter part of the valve seat member 4, and a plurality of second small diameter channels 42b that diverge from the second big diameter channel 42a and that extend in an axial direction of the valve seat member 4 so as to be in communication with the valve seat surface 4a.

The valve seat member 4 fits into a cylindrical concave part 52 arranged on the body 5. The cylindrical concave part 52 is arranged to divide the flow channel 51 of the body 5, and the flow channel in the upstream side (hereinafter also called the upstream side flow channel) 51(A) among the flow channels 51 divided by the concave part 52 opens, for example, on the bottom surface of the concave part 52 and the flow channel in the downstream side of the concave part 52 (hereinafter also called the downstream side flow channel) 51(B) opens, for example, on a side surface of the concave part 52.

Then, in a state that the valve seat member 4 is fittingly inserted into the concave part 52, the big diameter part of the valve seat member 4 fits into an inner circumferential surface of the concave part 52 with no space therebetween and a gap is formed between the small diameter part of the valve seat member 4 and the inner circumferential surface of the concave part 52 so that the upstream side flow channel 51(A) of the body 5 is in communication with the first valve inner flow channel 41 through the bottom surface of the concave part 52 and the downstream side flow channel 51(B) of the body 5 is in communication with the second valve inner flow channel 42 through a side peripheral surface of the concave part 52. In addition, the valve seat surface 4a becomes flat to a body outer surface surrounding the concave part 52.

The valve body member 6 is generally in a shape of a circular disk that is housed in a cylindrical casing member 72 mounted on the body 5 and that is arranged to face the valve seat member 4. Concretely, a peripheral edge part of the valve body member 6 is supported by the casing member 72 through a thin-walled toric diaphragm member 8. Then the valve seat member 6 moves due to an elastic transformation of the diaphragm member 8 and a seating surface 6a of the valve seat member 6 makes contact with or is separated from the valve seat surface 4a. The seating surface 6a is a plane.

The actuator 7 comprises a piezoelectric stack 71 formed, for example, by stacking a plurality of piezoelectric elements. The piezoelectric stack 71 is housed in the casing member 74 and a distal end part of the piezoelectric stack 71 is connected to an anti-seating surface side of the valve body member 6 through a stick-shaped middle connecting member 73. Then when a certain voltage is applied, the piezoelectric stack 71 is elongated and moves the valve body member 6 so that the seating surface 6a is pushed against the valve seat surface 4a so as to be in a closed state. In addition, when the voltage is below the certain voltage, the valve seat surface 4a is separated from the seating surface 6a by a distance corresponding to the voltage applied to the piezoelectric stack 71. Then the upstream side flow channel 51(A) is in communication with the downstream side flow channel 51(B) through the gap between the valve seat surface 4a and the seating surface 6a. More specifically, the fluid control valve 3 is a normal open type.

In this embodiment, as shown in FIG. 2 through FIG. 6, multiple (more than quadruplex or over) bottom formed toric grooves 9 that open into the valve seat surface 4a of the valve seat member 4 are formed. There are two kinds of the groove, and a narrow deep groove (hereinafter also called a first bottom formed groove 9(A)) and a wide shallow groove (hereinafter also called a second bottom formed groove 9(B)) are arranged in turn. Each bottom formed groove is a so called angle groove and its cross-section is in a rectangular shape.

The other end side of the second valve inner flow channel 42, namely the second small diameter channel 42b is in communication with the second bottom formed groove 9(B). Then, the width of the groove of the second bottom formed groove 9(B) is set to be equal to or a little larger than a substantial internal diameter of the second small diameter channel 42b located near the groove 9(B) so that a communication bore 42c, in communication with the second bottom formed groove 9(B), of the second small diameter channel 42b appears only on the bottom surface of the second bottom formed groove 9(B).

Figure 6:
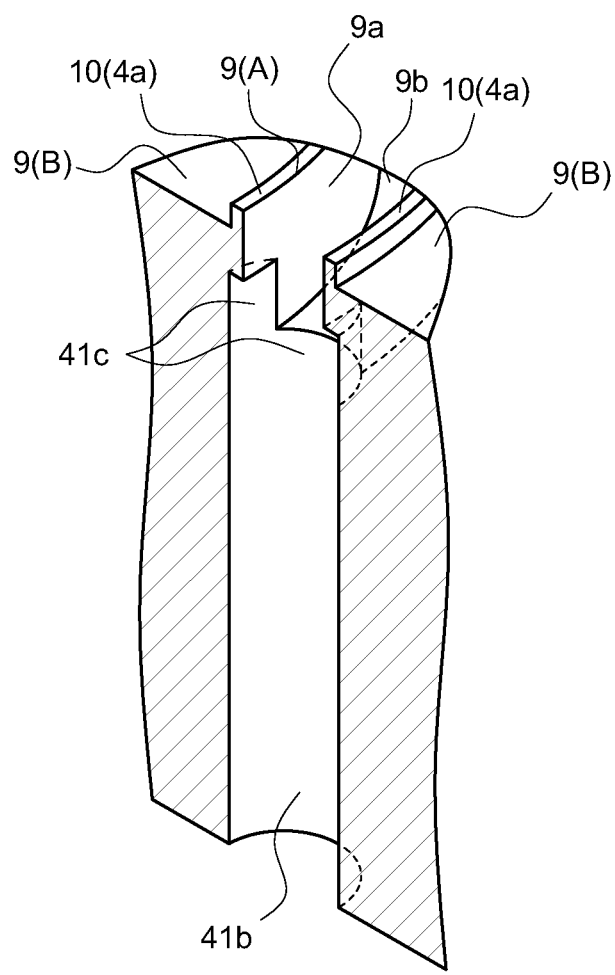
FIG. 6 is an enlarged cross-sectional perspective view showing a bottom formed groove in accordance with this embodiment.
Figure 7:
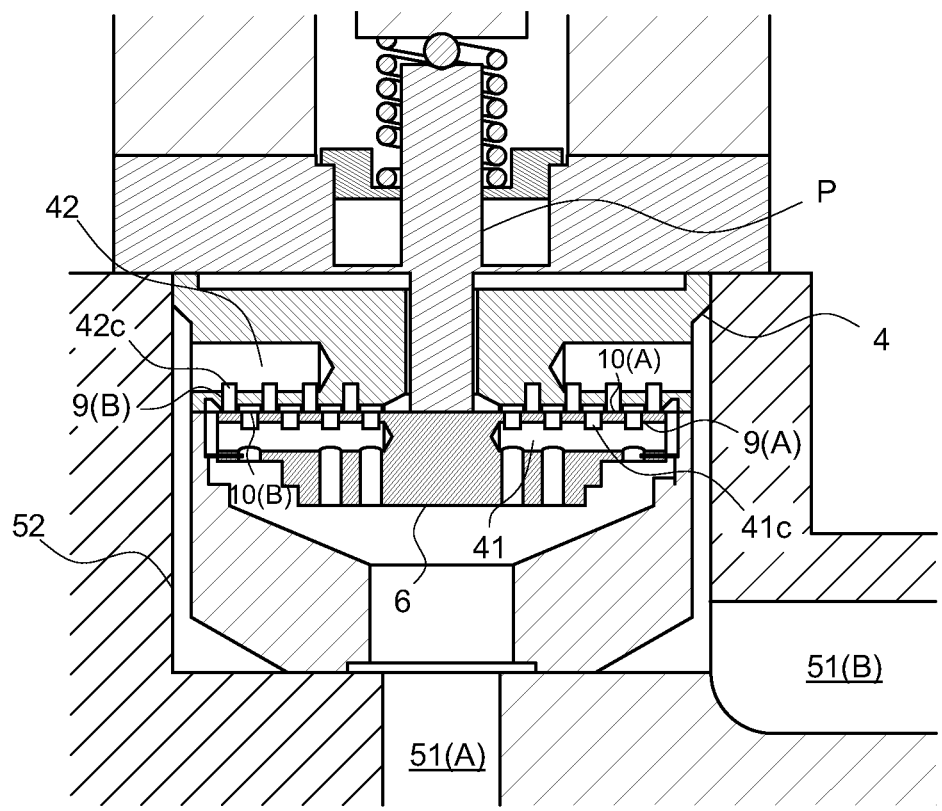
FIG. 7 is a cross-sectional view of a fluid control valve in accordance with a second embodiment of this invention.
Figure 8:
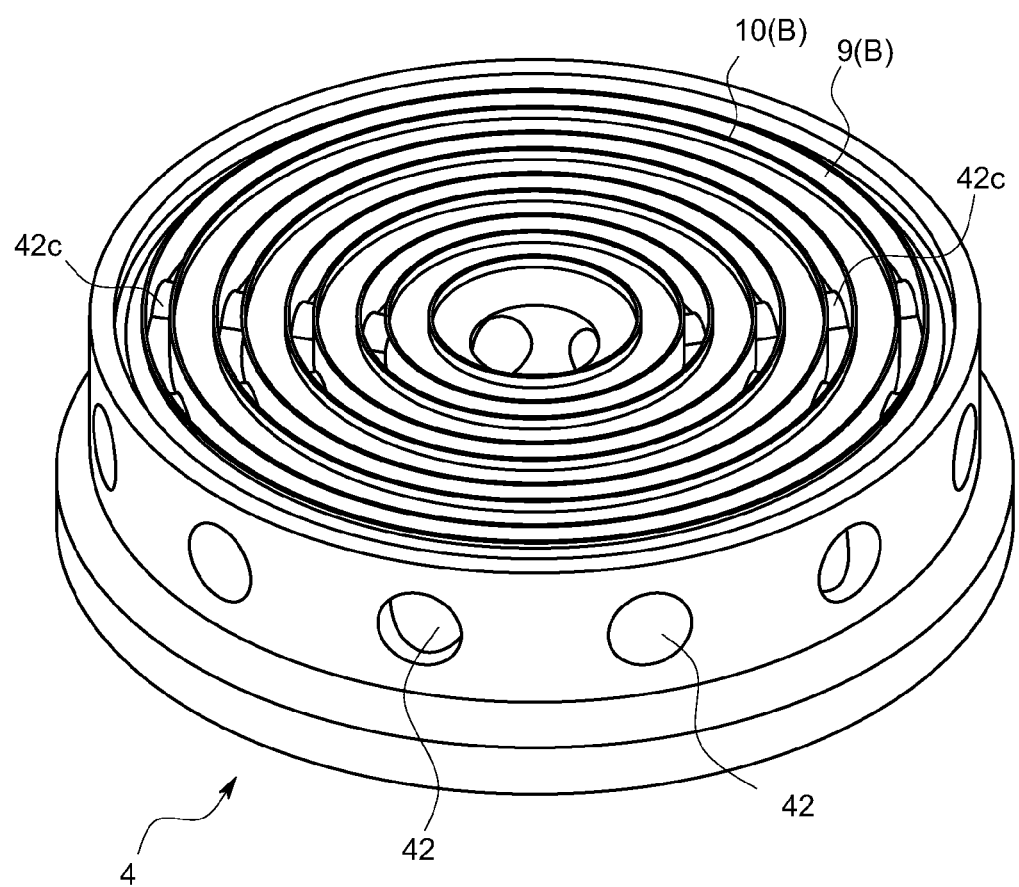
FIG. 8 is a perspective view of a valve seat member in this embodiment.
Figure 9:
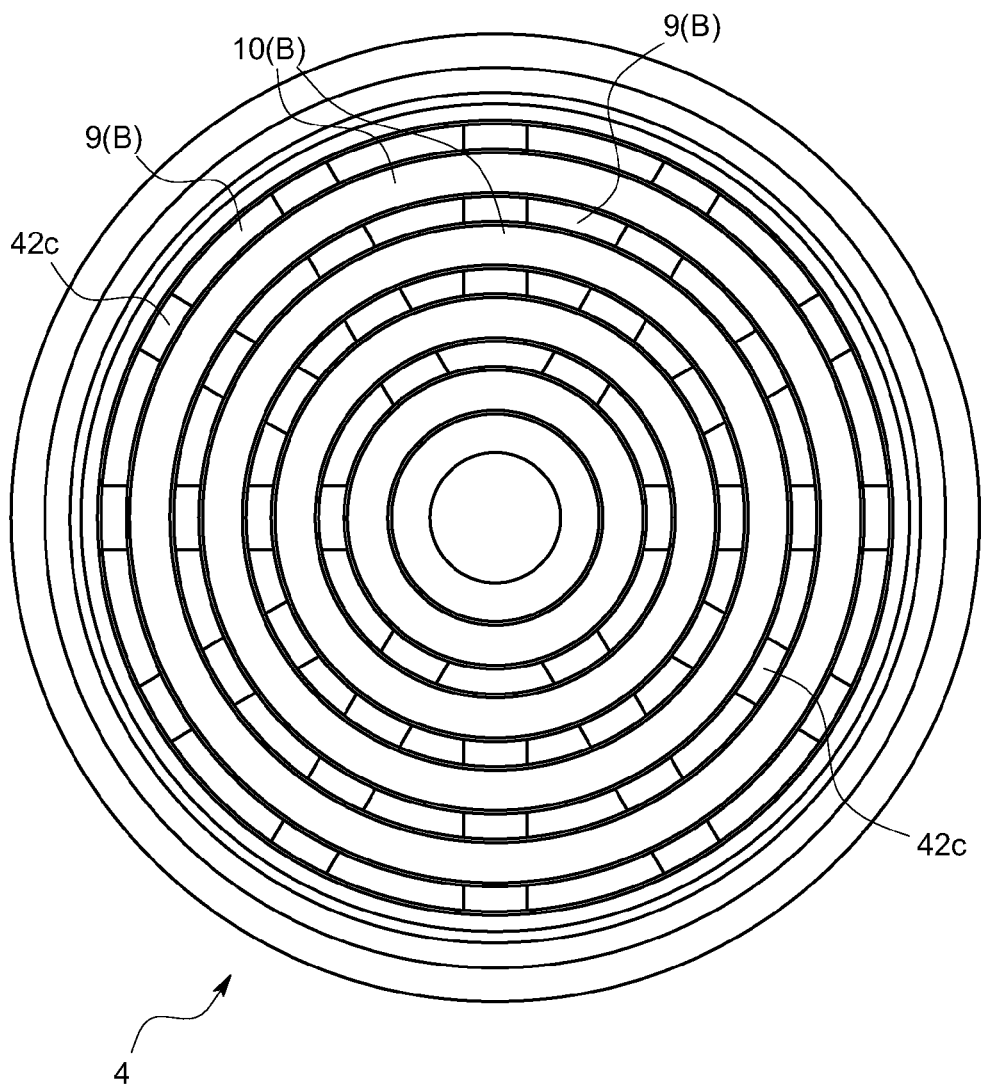
FIG. 9 is a plane view of the valve seat member in this embodiment.

The other end side of the first valve inner flow channel 41, namely the first small diameter channel 41b is in communication with the first bottom formed groove 9(A). Then, the width of the groove of the first bottom formed groove 9(A) is set to be smaller than a substantial internal diameter of the first small diameter channel 41b located near the groove 9(A). Especially as shown in FIG. 6, it is so arranged that a communication bore 41c, in communication with the first bottom formed groove 9(A), of the first small diameter channel 41b appears across the bottom surface 9b and the side surface 9a of the first bottom formed groove 9(A) and an opening area of the communication bore 41c becomes more than or equal to a substantial cross-sectional area (an effective cross-sectional area) of the first small diameter channel 41b. In addition, a plurality of communication bores 41c are arranged for a single first bottom formed groove 9(A) in this embodiment, however, a center of each communication bore 41c is not necessarily on a center line in a width of the first bottom formed groove 9(A) and some of them are deviated away from the center. Some deviated communication bores 41c appear on the bottom surface of the first bottom formed groove 9(A), and some deviated communication bores 41 appear on the side surface alone. In addition, there is a case that an area of the deviated communication bore 41c that appears on one side surface is different from an area of the deviated communication bore 41c that appears on the other side surface. This arrangement that the center of the opening is deviated away from the center is to facilitate processing of the first small diameter channel 41b or to avoid interference with other constituting elements.

In this embodiment, a size of the seating surface 6a of the valve body member 6 is so set to cover a projection 10 formed between the bottom formed groove 9 located at the most outer circumference in the valve seat member 4 and the bottom formed groove 9 located inside of the above-mentioned groove 9 by one. Accordingly, the diaphragm member 8 faces the bottom formed groove 9 located at the most outer circumference.

Meanwhile, since a certain width in the radial direction is necessary for the diaphragm member 8, a width of the bottom formed groove 9 located at the most outer circumference is set to be especially big in accordance with the width of the diaphragm member 8 in this embodiment.

As a result of this, if the bottom formed groove 9 located at the most outer circumference is in communication with the upstream side flow channel 51(A) whose pressure is high, a big force that is a value obtained by multiplying the opening area of the wide bottom formed groove located at the most outer circumference by the pressure and that is in a direction to open the valve body member 6 is applied to the valve body member 6. Then it becomes disadvantageous against keeping a secure closed state. In this embodiment, the bottom formed groove 9 located at the most outer circumference is in communication with the downstream side flow channel 51 (B) so as to be the second bottom formed groove 9(B) and then a turn of the bottom formed groove located inside of the second bottom formed groove 9(B) located at the most outside, namely the first bottom formed groove 9(A) or the second bottom formed groove 9(B) is determined by making use of the second bottom formed groove 9(B) as a standard.

Next, the behavior of the fluid control valve 3 will be explained.

As is clear from the above-mentioned arrangement, the upstream side flow channel 51(A) of the body 5 is in communication with the first bottom formed groove 9(A) through the first valve inner flow channel 41 and the downstream side flow channel 51(B) of the body 5 is in communication with the second bottom formed groove 9(B) through the second valve inner flow channel 42.

When a voltage is applied to the actuator 7, the valve body member 6 moves toward the valve seat member 4 so that the seating surface 6a attaches to the valve seat surface 4a, namely a top face of the projection 10. As a result of this, communication between the communication bore 41c of the first valve inner flow channel 41 formed for the first bottom formed groove 9(A) and the communication bore 42c of the second valve inner flow channel 42 formed for the second bottom formed groove 9(B) is blocked. In other word, the upstream side flow channel 51(A) in communication with the first valve inner flow channel 41 is blocked from the downstream side flow channel 51(B) in communication with the second valve inner flow channel 42 so that a flow of the fluid is blocked. This is the closed state.

Meanwhile, when a voltage applied to the actuator 7 is ceased, the valve body member 6 moves toward a direction opposite of the valve seat member 4, and the seating surface 6a is separated from the valve seat surface 4a, namely the top surface of the projection 10 to the maximum extent. As a result of this, the fluid flows from the communication bore 41c of the first valve inner flow channel 41 into the communication bore 42c of the second valve inner flow channel 42 through a gap between the projection 10 and the seating surface 6a. This is a fully open state.

In a case of controlling the flow rate of the fluid, a voltage between the stipulated maximum voltage and zero is applied to the actuator 7. Then, the flow rate is controlled by adjusting a distance of a gap between the top surface of the projection 10 and the seating surface 6a. This is a flow rate controlled state, and both the fully open state and the flow rate controlled state are collectively defined as the open state in this specification.

A valve open degree of the fluid control valve 3 is determined by a value obtained by multiplying the distance of the gap between the top surface of the projection 10 and the seating surface 6a by a total extending the distance of the projection 10; however, in accordance with the arrangement of this embodiment, since the groove width of the first bottom formed groove 9(A) is set to be smaller than the effective internal diameter of the first small diameter channel 41b, it is possible to multiplex the bottom formed grooves 9 compared with a conventional case wherein the groove width is set to be more than or equal to the effective internal diameter of the first small diameter channel 41b so that the total extending distance of the projection 10 can be elongated. Accordingly, even though the separated amount of the valve body member 6 is small, the same cross-sectional area of the flow channel as that of the conventional arrangement can be secured so that it is possible to flow at the same flow rate of the fluid as that of the conventional arrangement. Conversely, it is possible to flow at a much higher flow rate of the fluid if the valve body member 6 is separated by the same amount as that of the conventional arrangement.

Furthermore, since the area of the communication bore 41c formed from the narrow first bottom formed groove 9(A) can be secured to exceed a conventional area, namely an area of a circle whose diameter is the groove width, by making use of the side surface of the groove, the communication bore 41c will never be a bottleneck of the flow rate and it is not necessary to make the internal diameter of the first small diameter channel 41b small, which contributes to the facilitation of boring.

As mentioned, in accordance with this embodiment, it is possible to downsize the fluid control valve compared with a conventional arrangement due to downsizing the actuator, the valve seat surface and the seating surface, and conversely it is possible to increase the flow rate even though the size is the same as that in the conventional arrangement.

Second Embodiment

In this second embodiment, an arrangement of the valve seat member 4 and the valve body member 6 is inverted from the arrangement in the first embodiment. Specifically, the valve seat member 4 that does not move is arranged in an actuator 7 side and the valve body member 6 is connected to a body 5 side, namely a side opposite to the actuator 7 side through a connection rod (P) that penetrates the center of the valve seat member 4. In addition, the valve seat member 4 and the valve body member 6 fit into the concave part 52 arranged on the body 5. The concave part 52 is arranged to block the flow channel 51 of the body 5 similar to the first embodiment.

In a normal state wherein no voltage is applied to the actuator 7, the valve body member 6 is urged by a peripheral elastic body (a plate spring, in this embodiment) and attached to the valve seat member 4. When a voltage is applied to the actuator 7 so as to elongate the actuator 7, the valve body member 6 moves in a direction of being separated from the valve seat member 4 so as to be in an open state. More specifically, the fluid control valve 3 is a normal close type.

In this embodiment, multiple bottom formed toric grooves 9 are arranged on the seating surface 6a of the valve body member 6 and the valve seat surface 4a of the valve seat member 4 respectively. The bottom formed grooves arranged on the valve body member 6 are the first bottom formed grooves 9(A) and the bottom formed grooves arranged on the valve seat member 4 are the second bottom formed grooves 9(B).

The first bottom formed groove 9(A) and the second bottom formed groove 9(B) are arranged alternately. In a closed state, a projection (hereinafter also called the first projection 10(A)) formed between the adjacent first bottom formed grooves 9(A) blocks an opening of the second bottom formed groove 9(B), and a projection (hereinafter also called the second projection 10(B)) formed between the adjacent second bottom formed grooves 9(B) blocks an opening of the first bottom formed groove 9(A). In this embodiment, a toric groove that is more shallow than the bottom formed groove 9(A), 9(B) is further arranged on a surface of the second projection 10(B) so as to reduce pressure loss, however, the toric groove may be arranged on the first projection 10(A), or may be arranged on both the first projection 10(A) and the second projection 10(B).

In addition, the first valve inner flow channel 41 is arranged on the valve body member 6 and in communication with the first bottom formed groove 9(A) and the second valve inner flow channel 42 is arranged on the valve seat member 4 and in communication with the second bottom formed groove 9(B).

Figure 10:
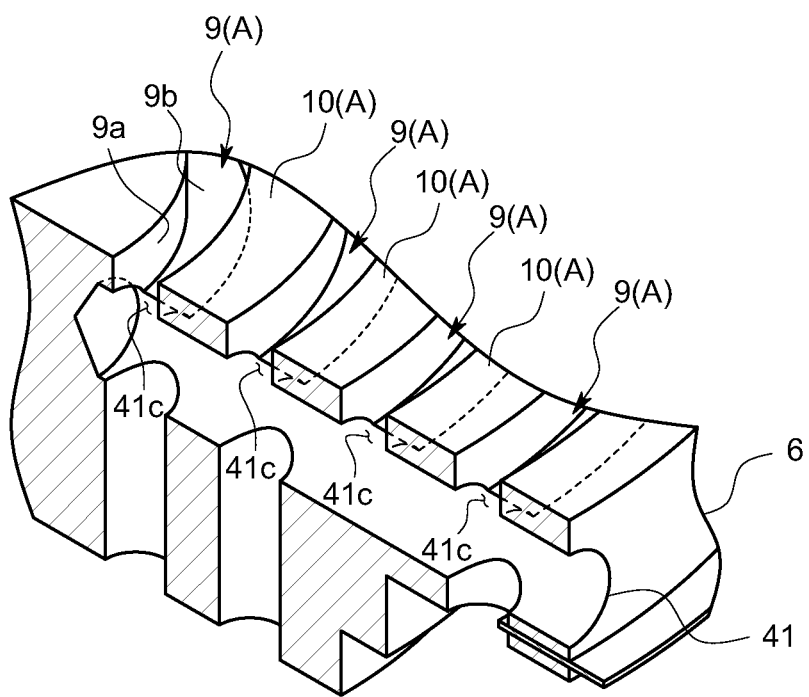
FIG. 10 is a partial cross-sectional perspective view of the valve body member in this embodiment.

The first valve inner flow channel 41 extends in the radial direction and one end part of the first valve inner flow channel 41 opens on a side peripheral surface of the valve body member 6, and a plurality of the first valve inner flow channels 41 are arranged radially in this embodiment. A side peripheral surface of the first valve inner flow channel 41 overlaps a bottom part of the first bottom formed groove 9(A), and the first valve inner flow channel 41 opens across the bottom surface 9b and the side surface 9a of the first bottom formed groove 9(A) as the communication bore 41c, especially as shown by a partially cross-sectional perspective view in FIG. 10. It is so arranged that an area of the communication bore 41c becomes more than or equal to a substantial cross-sectional area (an effective cross-sectional area) of the first valve inner flow channel 41. In addition, the first valve inner flow channel 41 diverges also in the axial direction and opens in a surface opposite to the seating surface side of the valve body member 6 and is in communication with the upstream side flow channel 51(A) that opens on the bottom surface of the concave part 52.

Figure 11:
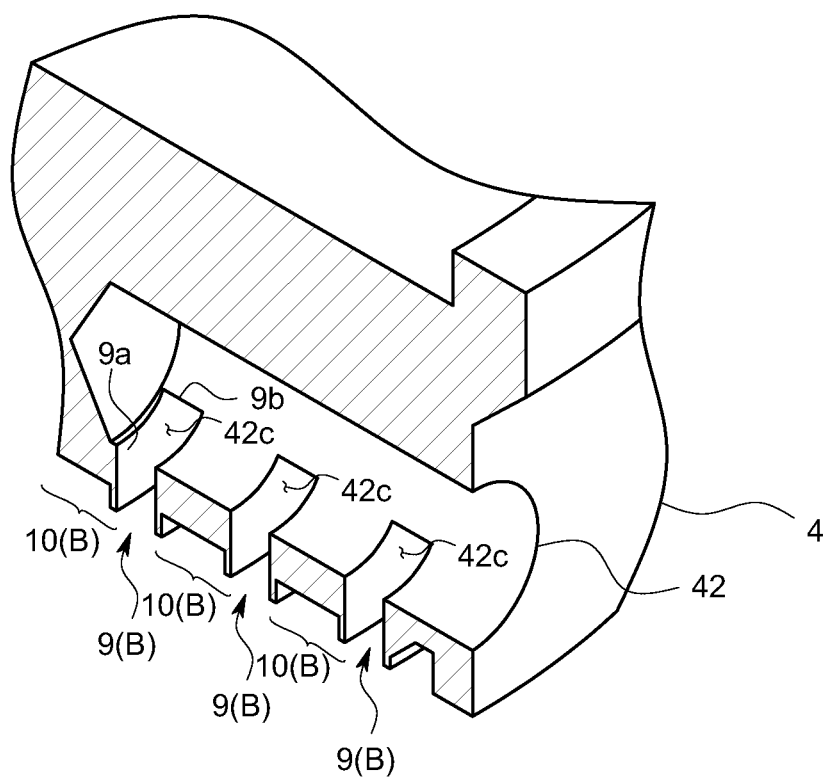
FIG. 11 is a partial cross-sectional perspective view of the valve body member in this embodiment.

One end part of the second valve inner flow channel 42 opens on the side peripheral surface of the valve seat member 4 and is in communication with the downstream side flow channel 51(B) that opens on the side peripheral surface of the concave part 52. Similar to the first valve inner flow channel 41, a plurality of second valve inner flow channels 42 extend radially, namely in the radial direction. A side peripheral surface of the second valve inner flow channel 42 overlaps a bottom part of the second bottom formed groove 9(B), the second valve inner flow channel 42 opens across the bottom surface 9b and the side surface 9a of the second bottom formed groove 9(B) as the communication bore 42c, especially as shown by a partially cross-sectional perspective view in FIG. 11. It is so arranged that an area of the communication bore 42c becomes more than or equal to a substantial cross-sectional area (an effective cross-sectional area) of the second valve inner flow channel 42.

In accordance with this arrangement, it is possible to fundamentally produce the same effect as that of the first embodiment. Furthermore, unlike the first embodiment, since the groove width of both the first bottom formed groove 9(A) and the second bottom formed groove 9(B) can be decreased, it is possible to enable further higher density so that the effect of the first embodiment can be made furthermore remarkable.

The present claimed invention is not limited to the above-mentioned embodiments.

For example, this invention is the flow rate control valve in the above-mentioned embodiments, it is possible to apply this invention to an ON/OFF open/close valve. In addition, the actuator is not limited to the piezoelectric actuator and may be an actuator using a magnet coil or the like.

A shape of the bottom formed groove is not limited to the rectangular and may be a channel or a circle. In a definition of the side surface and the bottom surface in case of the channel shape or the circle shape groove, a surface generally orthogonal to a direction of the groove depth is set as the bottom surface, a surface generally parallel to the direction of the groove depth is set as the side surface and a surface with a middle angle is set as the side surface.

In addition, the bottom formed groove is not limited to the shape of the single groove, and may comprise a plurality of groove elements, namely, may be a shape where more than or equal to one projection is arranged on the bottom surface of the groove. The top surface of the projection may make contact with or may be separated from the valve member that faces the projection in a closed state.

A part or all of the above-mentioned embodiment or the modified embodiment may be appropriately combined, and it is a matter of course that the present claimed invention is not limited to the above-mentioned embodiment and may be variously modified without departing from the spirit of the invention.

EXPLANATION OF REFERENCE CHARACTERS

3 . . . fluid control valve
4 . . . valve seat member (one of the valve members)
41 . . . first valve inner flow channel
42 . . . second valve inner flow channel
4a . . . valve seat surface
41c . . . communication bore
6 . . . valve body member (the other of the valve members)
6a . . . seating surface
9(A) . . . first bottom formed groove
9(B) . . . second bottom formed groove
9a . . . groove side surface
9b . . . groove bottom surface

The invention claimed is:

1. A fluid control valve comprising a pair of valve members, on one of which is formed a seating surface and on the other of which is formed a valve seat surface, wherein
generally ring-shaped first bottom formed grooves that are in communication with an outside upstream side flow channel through a first valve inner flow channel arranged inside of the valve member and generally ring-shaped second bottom formed grooves that are in communication with an outside downstream side flow channel through a second valve inner flow channel arranged inside of the valve member are alternately arranged on either one of the seating surface and the valve seat surface,
in a state that the seating surface and the valve seat surface are in contact with each other, communication between an opening of the first bottom formed groove and an opening of the second bottom formed groove is blocked so as to be in a closed state wherein the upstream side flow channel is not connected to the downstream side flow channel, and in a state that the seating surface is separated from the valve seat surface, the opening of the first bottom formed groove is in communication with the opening of the second bottom formed groove through a gap between the seating surface and the valve seat surface so as to be in an open state wherein the upstream side flow channel is connected to the downstream side flow channel, and
a communication bore in communication with the first or second bottom formed groove of the first or second valve inner flow channel is formed at least on a side surface of the first or second bottom formed groove.

2. The fluid control valve described in claim 1, wherein the communication bore is formed across a bottom surface and the side surface of the bottom formed groove.

3. The fluid control valve described in claim 1, wherein an area of the communication bore is set to be more than or equal to a cross-sectional area of the first or second valve inner flow channel at a position immediately anterior to the communication bore.

4. The fluid control valve described in claim 2, wherein the first or second valve inner flow channel extends from a direction of a bottom of the bottom formed groove and its distal end part opens on the bottom surface and the side surface of the bottom formed groove as the communication bore.

5. The fluid control valve described in claim 1, wherein the first or second valve inner flow channel extends from a direction generally orthogonal to an extending direction of the bottom formed groove and a side peripheral surface opens on the bottom surface and the side surface of the bottom formed groove as the communication bore.

6. A fluid control valve comprising a pair of valve members on one of which is formed a seating surface and on the other of which is formed a valve seat surface, wherein
generally ring-shaped first bottom formed grooves that are in communication with an outside upstream side flow channel through a first valve inner flow channel arranged inside of one of the valve members are arranged in multiple layers on either one of the seating surface and the valve seat surface and generally ring-shaped second bottom formed grooves that are in communication with an outside downstream side flow channel through a second valve inner flow channel arranged inside of the other valve member are arranged at each position between adjacent first bottom formed grooves in multiple layers on the other of the seating surface and the valve seat surface,
in a state that the seating surface and the valve seat surface are in contact with each other, communication between an opening of the first bottom formed groove and an opening of the second bottom formed groove is blocked so as to be in a closed state wherein the upstream side flow channel is not connected to the downstream side flow channel, and in a state that the seating surface is separated from the valve seat surface, the opening of the first bottom formed groove is in communication with the opening of the second bottom formed groove through a gap between the seating surface and the valve seat surface so as to be in an open state wherein the upstream side flow channel is connected to the downstream side flow channel, and
a communication bore that is in communication with the bottom formed groove of the valve inner flow channel is formed at least on a side surface of the bottom formed groove.

7. The fluid control valve described in claim 6, wherein the communication bore is formed across a bottom surface and the side surface of the bottom formed groove.

8. The fluid control valve described in claim 6, wherein an area of the communication bore is set to be more than or equal to a cross-sectional area of the valve inner flow channel at a position immediately anterior to the communication bore.

9. The fluid control valve described in claim 7, wherein the first or second valve inner flow channel extends from a direction of the bottom of the bottom formed groove and its distal end part opens on the bottom surface and the side surface of the bottom formed groove as the communication bore.

10. The fluid control valve described in claim 6, wherein the first or second valve inner flow channel extends from a direction generally orthogonal to an extending direction of the bottom formed groove and a side peripheral surface opens on the bottom surface and the side surface of the bottom formed groove as the communication bore.

\* \* \* \* \*